US007827825B2

(12) United States Patent
Demars et al.

(10) Patent No.: US 7,827,825 B2
(45) Date of Patent: Nov. 9, 2010

(54) TOOL-HOLDER DEVICE FOR COOPERATING WITH GLASS

(75) Inventors: Yves Demars, Agnetz (FR); Jean-Pierre Douche, Le Plessis Brion (FR)

(73) Assignee: Saint-Gobain Glass France, Courbevoie (FR)

( * ) Notice: Subject to any disclaimer, the term of this patent is extended or adjusted under 35 U.S.C. 154(b) by 1329 days.

(21) Appl. No.: 10/541,675

(22) PCT Filed: Jan. 14, 2004

(86) PCT No.: PCT/FR2004/000054

§ 371 (c)(1),
(2), (4) Date: Jul. 8, 2005

(87) PCT Pub. No.: WO2004/072424

PCT Pub. Date: Aug. 26, 2004

(65) Prior Publication Data

US 2006/0123850 A1 Jun. 15, 2006

(30) Foreign Application Priority Data

Jan. 15, 2003 (FR) .................................. 03 00378

(51) Int. Cl.
*C03B 9/41* (2006.01)

(52) U.S. Cl. ............................ 65/160; 65/158; 156/99; 156/107; 118/500; 118/503

(58) Field of Classification Search ................. 156/109, 156/99, 350, 358, 367, 368, 378; 118/500, 118/503, 668; 65/160, 158
See application file for complete search history.

(56) References Cited

U.S. PATENT DOCUMENTS

| | | | |
|---|---|---|---|
| 3,473,988 A | 10/1969 | Rullier et al. | |
| 3,886,013 A | 5/1975 | Bowser et al. | |
| 4,911,779 A * | 3/1990 | Lenhardt | 156/556 |
| 5,358,568 A * | 10/1994 | Okano et al. | 118/323 |
| 7,141,282 B2 * | 11/2006 | Demars et al. | 428/34 |

FOREIGN PATENT DOCUMENTS

| | | |
|---|---|---|
| EP | 0 122 405 | 10/1984 |
| EP | 0 671 534 | 9/1995 |
| FR | 2 636 380 | 3/1990 |
| FR | 2 807 783 | 10/2001 |
| JP | 10-158041 | 6/1998 |

* cited by examiner

*Primary Examiner*—Kat Wyrozebski
*Assistant Examiner*—Daniel Lee
(74) *Attorney, Agent, or Firm*—Oblon, Spivak, McClelland, Maier & Neustadt, L.L.P.

(57) ABSTRACT

A tool holder device supporting at least one tool configured to collaborate with at least one substrate positioned on edge. The tool holder device makes the tool move translationally and rotationally relative to the substrate, it being possible for the substrate to be moved translationally relative to the tool as the tool is operating. Collaboration between the tool and the substrate occurs with or without contact relative to the edge face of the substrate.

21 Claims, 6 Drawing Sheets

TOOL-HOLDER DEVICE FOR COOPERATING WITH GLASS

BACKGROUND OF THE INVENTION

The invention relates to a tool holder device supporting at least one tool intended to collaborate, with or without contact, with at least one glass substrate. The issue here is that of being able, by virtue of this device, to collaborate with at least one glass substrate in order for example to take measurements, detect faults, shape, machine, treat, etc.

By way of example, the device of the invention will be described in its use relating to the manufacture of insulating glazing comprising at least two glass substrates and at least one interlayer secured to the edge faces of the substrates.

Such insulating glazing is, for example, disclosed in patent application FR 2 807 783. Arranging the interlayer on the edge face of the glazing has the advantage in particular of improving the visibility through the glazing by comparison with glazing in which the interlayer is arranged against the internal faces of the sheets of glass.

This same patent application FR 2 807 783 describes a method for assembling substrates, or sheets of glass, encircled around their edge face with the interlayer. Only the step of assembling the sheets of glass and the interlayer is described, that is to say the step when the sheets of glass are in a separated position facing one another in order to take the interlayer. The sheets of glass are kept separated on their edge by means of suction cups for example, while the interlayer is bonded and pressed against the edge face of the glazing using press rollers the two of which together run along the entire periphery of the glazing.

Nonetheless, ahead of this assembly step, it is necessary to prepare the positioning of the sheets of glass and to make sure of the optical and dimensional qualities of the glass, and to envision, and possibly perform, prior to assembly, the scrapping of sheets of glass that do not meet the quality criteria.

Furthermore, the assembly step envisioned in that application may not necessarily be suitable for long glazing perimeters because the interlayer, which starts out wound, is first of all paid out and then laid out flat in a length that corresponds to the perimeter of the glazing. Now, this laying of the interlayer out flat before it is applied against the edge face of the glazing may require a great deal of space to accommodate it, and this cannot always be provided in a production plant where it is always desirable to minimize such a space requirement.

SUMMARY OF THE INVENTION

Hence, the invention proposes a device which allows a tool, supposed to collaborate with at least part of the periphery of the substrate, to run around said substrate quickly and without requiring a great deal of accommodating space. It may for example be used in the manufacture of glazing, particularly in the steps of preparation for assembly and of assembly, thus making it possible to optimize the manufacturing time and the accommodating space required on the manufacturing line.

Document EP 0 222 349-B1 discloses a tool holder device supporting at least one tool intended to collaborate with at least one substrate with the substrate positioned on edge, the device being able to make the tool move translationally and rotationally relative to the substrate, it being possible for said substrate to be moved translationally relative to the tool as the tool is operating. Nonetheless, this device is specifically designed to collaborate with one of the faces of the substrate in order for example to apply a bonding material to it and thus associate another substrate with the face of this substrate.

This device cannot, however, for example be used for assembling two substrates via their edge face.

It is therefore another object of the invention to provide a device that can perform such assembly.

According to the invention, the device is characterized in that the collaboration between the tool and the substrate or substrates occurs with or without contact relative to the edge face of the substrate or substrates.

According to one feature, the device is controlled via a control loop to ensure precise positioning of the tool relative to the substrate.

Hence, the device comprises means for compensating for the position of the substrate or substrates and at least one position sensor, which means and sensor are intended to be associated with the tool.

The tool or tools consist of means for measuring, machining, shaping or treating the glass substrate or substrates. For example, the tool or tools consist of means of applying and bonding an interlayer to all or part of the periphery and to the edge faces of at least two substrates facing each other.

The applying and bonding means consist of at least two press rollers each one designed to press against one of the edge faces of the two substrates, the two rollers being control-loop controlled independently. In addition, means for compensating for the position of each substrate and a position sensor are associated with each of the press rollers respectively.

This compensation makes it possible, on the one hand, to absorb small dimensional variations of each substrate and, on the other hand, to provide a constant pressing force on the interlayer already coated with adhesive, these two features having necessarily to be taken into consideration for thin bonding to the edge face of a substrate.

According to another feature, the tool holder device comprises a rotary support on which the tool is fixed and a linear guidance element with which said rotary support collaborates, the support being prevented from rotating when moved translationally by means of the guidance element.

Advantageously, the tool holder device comprises a vertical beam provided with the rotary support and with the linear guidance element extending at least partially over the height of the beam.

As a preference, the tool holder device comprises a first tool able to move translationally and/or rotationally, and a second tool which is arranged fixedly and is able to operate while the substrate or substrates are moving translationally.

The rotational and translational movements of the tool or tools and the control loop control of the device are advantageously controlled by numerical control means.

The invention also relates to an installation comprising a tool holder device of the invention and at least one module for holding and positioning the substrate or substrates in the three directions of space (X, Y, Z) facing the tool holder device.

According to one feature, the holding and positioning module consists of a fixed chassis which comprises a roughly vertical stand, means for holding and positioning a substrate against the stand in the X and Y directions, and means for holding and positioning the substrate in the Z-direction.

Advantageously, the means for holding and positioning the substrate are controlled through a control loop so as always to position the substrate appropriately relative to the device.

The means for holding and positioning a substrate comprise particularly conveyor belts and suction means able to hold the substrate tightly against said belts.

In another embodiment, the holding and positioning module consists of a fixed chassis and a moving chassis, these chassis collaborating with one another in such a way as each to support at least one substrate, the substrates being placed facing each other and positioned relative to one another with a given separation.

As a preference, the fixed chassis and the moving chassis are open in their upper part so as to support substrates of any dimensions, and particularly of dimensions greater than those of the stand part of the chassis.

Advantageously, the moving chassis comprises means for positioning, in the Z-direction, the substrate resting on the moving chassis so as to obtain the desired separation between the two substrates.

Furthermore, in this last embodiment, the moving chassis comprises means for holding and positioning, in the X-direction, the two substrates resting on the fixed and moving chassis, these holding and positioning means being able to be moved in the Z-direction independently of the moving chassis.

Finally, the holding and positioning module comprises means for transferring a substrate supported by the fixed chassis so as to transfer it to the moving chassis.

According to another feature, the means for holding and positioning a substrate comprise conveyor belts and suction means able to hold the substrate tightly against said belts. Advantageously, an additional high-performance suction device is also provided, so as to guarantee, for as long as possible, a tangential holding force holding the substrate at the end of the module.

According to yet another feature, a holding system using suction cups may be associated with the holding and positioning module, for routing, from the module to an adjacent support element, a substrate which, in the X-direction, has a dimension roughly equivalent to or smaller than the space separating the holding and positioning module from the support element adjacent to said module.

As a preference, the installation will comprise several modules for progressing, holding and positioning substrates, which may or may not be electronically coupled depending on the lengths of the substrates in order to optimize manufacturing rates.

By way of example, the progressing, holding and positioning module constitutes a module for preassembling and/or assembling insulating glazing comprising at least two glass substrates and an interlayer secured to all or part of the periphery of the substrates.

BRIEF DESCRIPTION OF THE DRAWINGS

Other details and advantages of the invention will now be described with reference to the attached drawings in which.

DETAILED DESCRIPTION OF THE INVENTION

Figure 1:
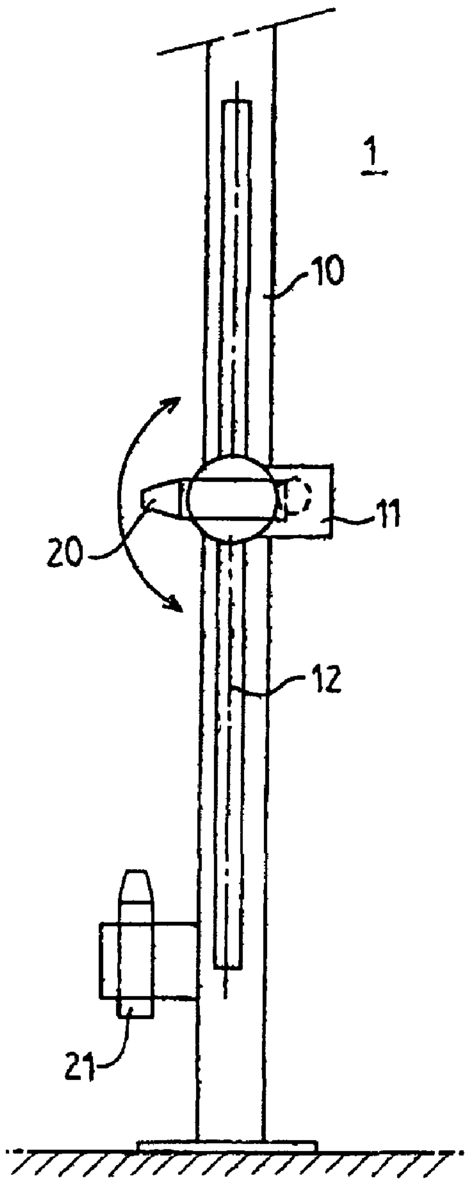
FIG. 1 shows an elevation of the device of the invention.

FIG. 1 illustrates a tool holder device 1 according to the invention which comprises a vertical oblong beam 10, a rotary support 11 on which a moving tool 20 is fixed, and a linear guidance element 12 extending over the height of the beam and with which the rotary support collaborates, the support 11 being prevented from rotating when it is intended to be moved translationally by means of the guidance element 12. The rotation and translational movement of the support 11, which allow the translational and rotational movements of the tool as it operates, are controlled by numerical control means, not illustrated.

The device 1 is intended to collaborate with the glass consisting of one or more substrates. The device can also support another fixed tool 21.

The tool or tools 20 and 21 are any kinds of tool supposed to collaborate with the glass in order to perform contact operations with a view, for example, to shaping, machining, grinding, performing surface treatment of the glass, or contactless operations such as operations of measuring characteristics of the glass.

The device of the invention is intended to be used in an installation in which the glass substrate or substrates are arranged on edge to collaborate with the tool or tools. For this, the installation comprises at least one module 3 for holding and positioning the substrate or substrates in the three directions of space X, Y, Z with respect to the tool holder device. The X-direction consists of the horizontal direction in which the substrate is routed and progressed, the Y-direction perpendicular to the X-direction is situated in a vertical plane and the Z-direction perpendicular to the X and Y directions is situated in the horizontal plane of the X direction.

Figure 2:
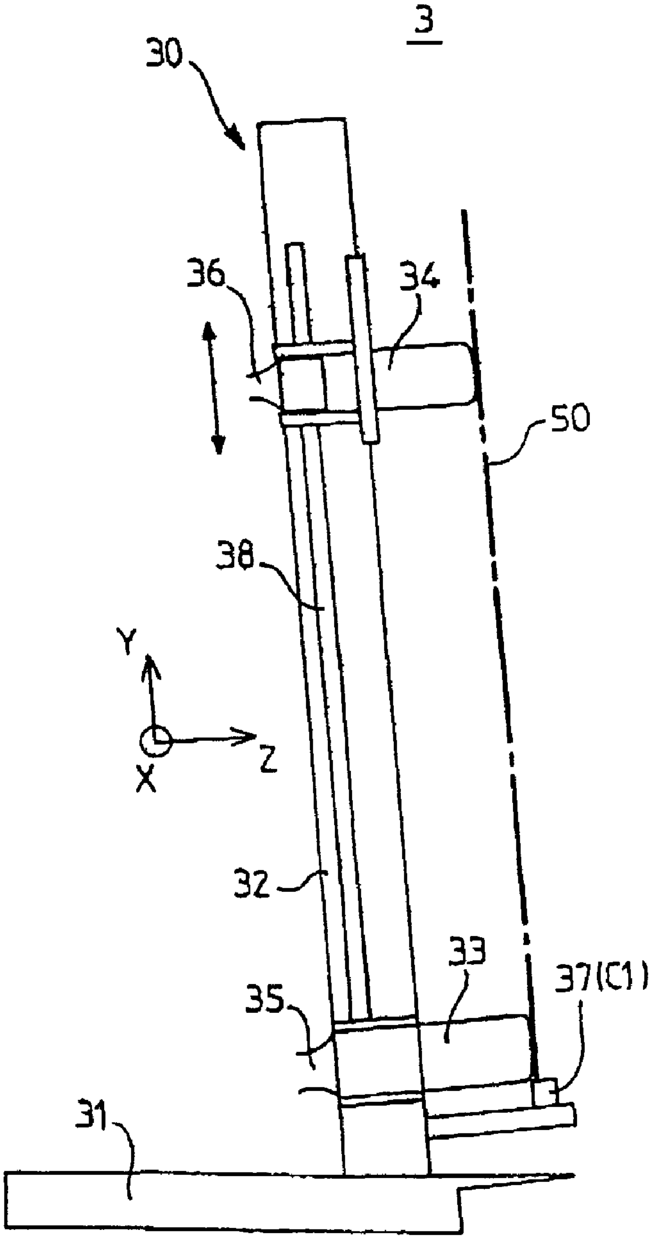
FIG. 2 shows a sectioned view of a module for holding and positioning at least one glass substrate, comprising a support chassis.
Figure 3:
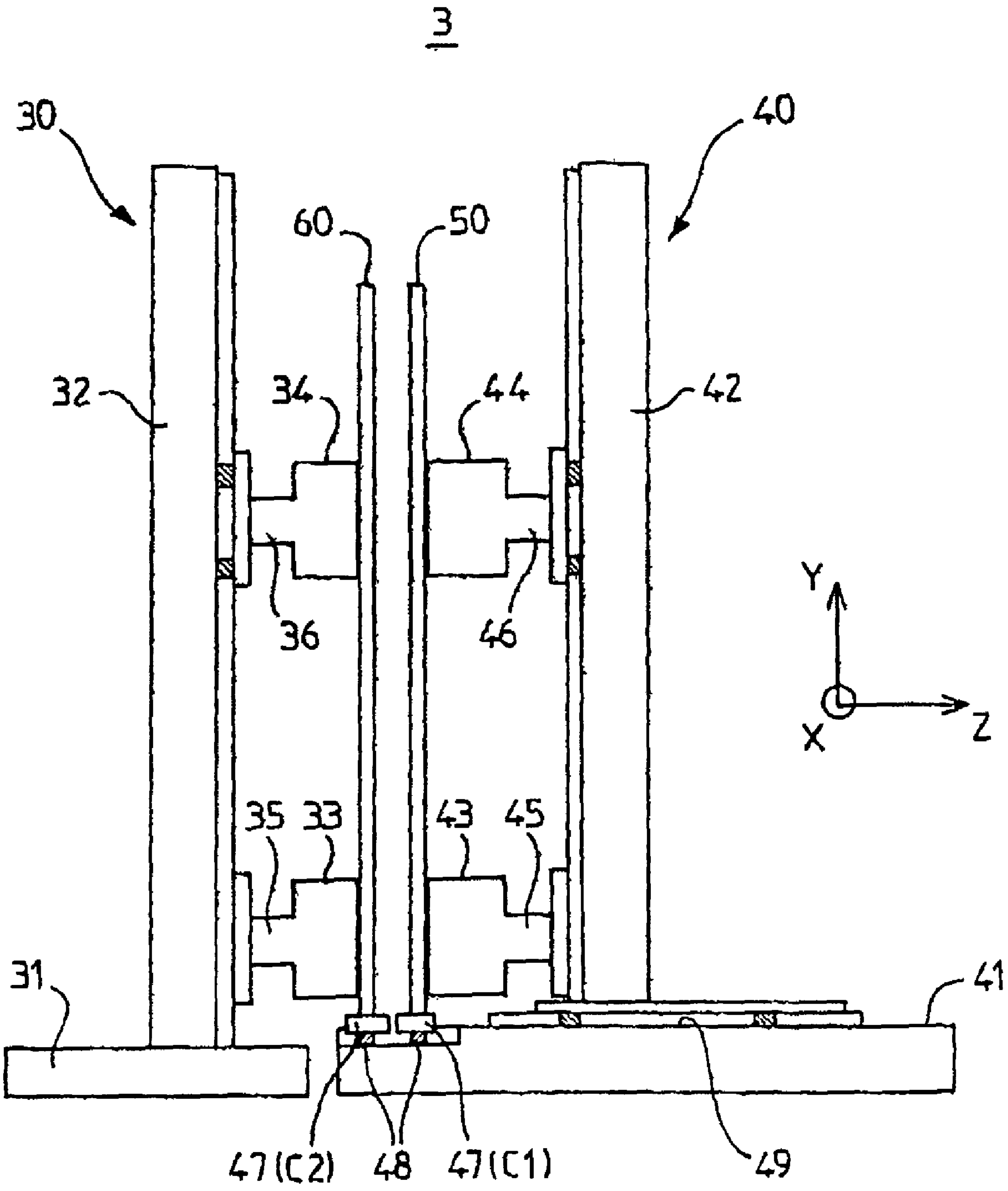
FIG. 3 is a variant of FIG. 2 comprising two support chassis for supporting the glass.

The holding and positioning module 3 illustrated in FIG. 2 and, as a variant, in FIG. 3 comprises at least a fixed chassis 30. The variant in FIG. 3 comprises a fixed chassis 30 identical to that of FIG. 2 and a moving chassis 40 designed to collaborate with the fixed chassis.

The fixed chassis 30, the only one in FIG. 2, is for example used to support a single glass substrate 50 or an assembled product equipped with at least one glass substrate with which the tool or tools of the tool holder device collaborate, while the setup in FIG. 3, with the fixed chassis 30 and the moving chassis 40, is intended to support at least two substrates 50 and 60, at least one on the fixed chassis and at least one on the moving chassis, in order for example to assemble these in order to form insulating glazing.

The fixed chassis 30 has a base 31, a roughly vertical stand 32, preferably inclined by about 6° to provide the substrate with stability and open at its upper part to support substrates of large dimensions greater than the height of the stand, two endless belts 33, 34 arranged in a plane parallel to that of the stand and separated from one another by a distance corresponding roughly to the height of a sheet of glass, suction means 35 and 36 associated with the belts, and press rollers 37 for the edge of the glass, these rollers being placed along the lower part of the stand and able to turn to form a path C1 for progressing the glass substrate 50 in the X-direction.

Figure 4A:
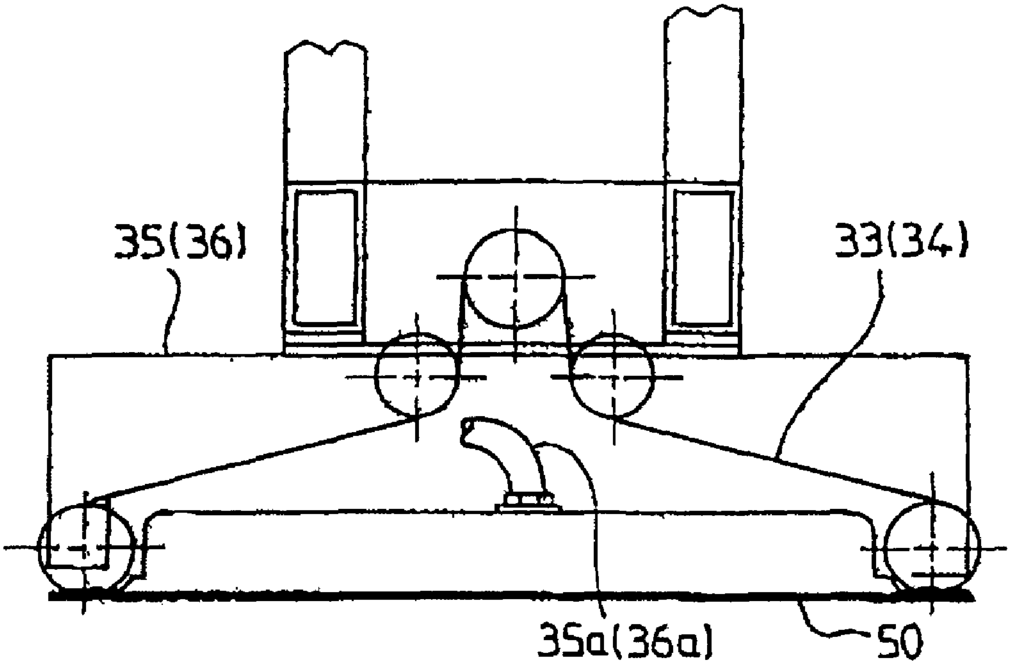
FIG. 4*a* is a view from above and in section of the substrate suction means for holding it on the support chassis.
Figure 4B:
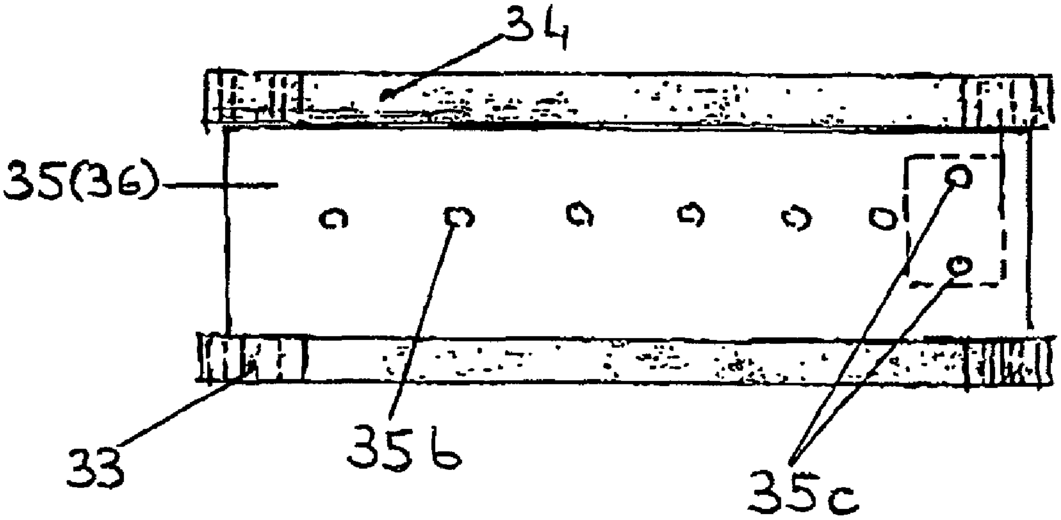
FIG. 4*b* is an elevation of the substrate suction means.

The suction means 35 or 36 illustrated in FIGS. 4*a* and 4*b* consist of a box structure, around which the belt 33 or 34 is arranged, the belts projecting appreciably from the box structure so that the sheet of glass 50 rests on the belts.

The belts are made of a non-slip material having a high coefficient of friction, of the rubber type. They are driven in the same direction and synchronously by a motor system, not depicted.

The box structure 35 or 36 consists of a hollow profile section equipped on its face facing the sheet of glass with a multitude of holes 35*c* through which air can pass. The box structure 35 or 36 is connected to a vacuum duct 35*a* or 36*a*, respectively, so as to create a vacuum to suck the sheet of glass firmly against the belts 33 and 34.

Thus, a sheet of glass 50 rests on edge on the press rollers 37 and is pressed firmly by its lower and upper parts respectively against the pairs of belts 33 and 34 by the suction exerted by the box structures 35 and 36. As a result, the belts 33, 34 and the rotary press rollers 37 constitute means for holding and positioning the substrate 50 against the stand in the X, Y and Z directions, and means for progressing the substrate in the X-direction.

Advantageously, the combination of the belt 34 and of the box structure 36 associated with the upper part of the sheet of glass 50 is able to be moved heightwise by virtue of a vertical guidance rail 38 provided over the height of the stand 32 so as to tailor the separation of the belts to the height of the sheet of glass.

On leaving the module 3, the substrate is, for example, transferred to another module and the remainder of the surface of the substrate still resting there needs to be held pressed as firmly as possible against the stand. Hence, an additional high-performance suction device comprising one or more suction nozzles 35*c* (FIG. 4*b*) independent of the vacuum duct 35*a* or 36*a* is provided, arranged at the end of the box structure. It makes it possible to create an even stronger vacuum than the duct 35*a* in conjunction with the holes 35*b* so as to make up for the leakage flow through these holes which are no longer in contact with the substrate. Hence, the device makes it possible to guarantee, for as long as possible, that there is a tangential holding force holding the substrate and to compensate for the pressing force exerted by the tool, for example as a strip precoated with adhesive is applied to the edges of the substrates.

When the substrate 50 is in place on the module 3 comprising only the fixed chassis 30, the substrate is able to progress along the chassis in the X-direction (FIG. 5) and in the direction of the arrow F from the upstream to the downstream end and be stopped between two positions A and B to collaborate with at least one tool belonging to the device 1.

A tool is, for example, an optical sensor of known type, without contact, intended to supply a roughness value and to measure the thickness of the substrate over its entire periphery. Indeed, according to the use made of the sheets of glass, it sometimes proves essential to check the surface finish of the edge faces of the glass. When the float glass is broken into sheets of glass of given dimensions, defects resembling burrs are caused, often near the corners. Too many defects mean that the sheet of glass cannot be used and it is then removed from the installation.

The device 1 of the invention allows the substrate or sheet of glass to be moved around by rotating the sensor in order to position it appropriately facing the sheet of glass and by translationally moving the sensor with respect to the sheet of glass in order to take the measurements.

Figure 6:
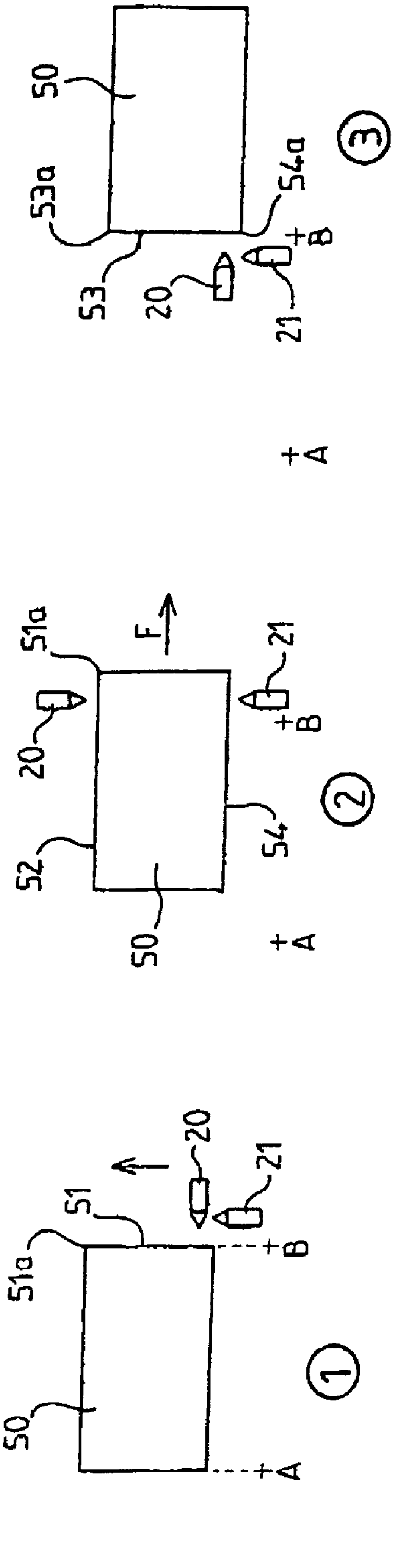
FIG. 6 schematically illustrates the steps of moving around a sheet of glass using the device of the invention.

Hence, with reference to FIG. 6, in a first step (1), with the sheet of glass 50 immobilized between the positions A and B, the tool, in this instance the sensor 20, translationally via the guidance rail 12, follows the vertical side 51 of the sheet of glass downstream of the module to position B, then in a second step (2), and after it has been rotated at the top corner 51*a*, it is held in a fixed position while the sheet of glass is moved translationally along its length parallel to the drive path in the direction of the arrow F from the upstream position A to the downstream position B, so that the sensor is aimed at the entirety of the horizontal top side 52. To save measurement time, a second, fixed, optical sensor 21 is provided, arranged at position B, and this then, in a similar way to the sensor 20, is aimed at all of the lower horizontal side 54 as the sheet of glass moves. Finally, in a last step (3), when the vertical upstream side 53 of the sheet of glass arrives at position B, the sensor 20 rotates about the upstream top corner 53*a* and, dropping down parallel, runs along the side 53 of the sheet of glass as far as the bottom corner 54*a*.

The sensors 20 and 21 remain fixed while the horizontal sides 52 and 54 are being measured because these are straight; the sensors could be mobile in a direction perpendicular to the horizontal sides of the glass if these sides had a non-rectilinear geometry, in order to maintain a constant distance between the sensor and the edge face of the glass so as to guarantee a uniform measurement.

The sensor 20 is therefore positioned and moved by means of the device 1 so as to assist with moving around the sheet of glass.

The guidance element 12 of the device allows the sensor to move translationally up and down to aim at the respective vertical sides 51 and 53 of a sheet of glass. The rotating of the support 11 allows the sensor to be arranged in an aiming position facing, on the one hand, the horizontal top side 52 after measuring the downstream vertical side 51 and, on the other hand, the upstream vertical side 53 having measured the horizontal top side 52.

The support 11 is thus able to rotate through 180° so as to perform a first rotation through 90° at the top corner 51*a* of the sheet of glass then a second rotation through 90° at the top corner 53*a*.

The module 3 for holding and positioning the glass also comprises, in the variant of FIG. 3, a moving chassis 40. The module 3 may then for example constitute a station for preassembling and/or assembling glazing such as in an installation for the manufacture of insulating glazing.

Figure 7:
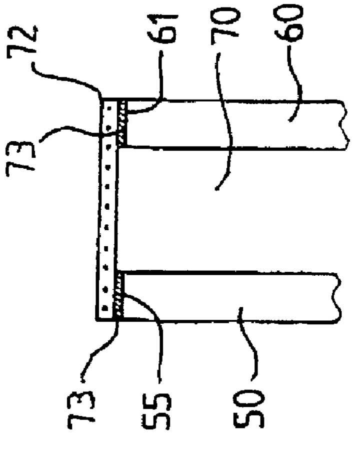
FIG. 7 shows a sectioned part view of insulating glazing.

Insulating glazing of the type illustrated in FIG. 7 comprises at least two substrates or sheets of glass 50 and 60 spaced apart by a layer of gas 70, an interlayer 72 which serves to space the two sheets of glass apart and whose function is to hold them mechanically, the interlayer also acting as a sealing means to seal the glazing against liquid water, solvent and water vapor. The interlayer 72 is in the form of a more or less flat profile strip about 1 mm thick and of roughly parallelepipedal cross section. In the manner of a ribbon, it surrounds at least one side of the glazing, being fixed to the edge faces 55 and 61 of the sheets of glass by securing means 73.

For further details about this insulating glazing reference can be made to patent application FR 01/13 354.

A conventional glazing manufacturing line comprises several workstations butting up against each other in the same direction. The workstations can be separated so as to tailor the arrangement of the line to the requirement, in order for example to add certain workstations according to the type of glazing being manufactured or alternatively to increase the number of workstations because a greater amount of glazing is to be produced and/or because the glazing elements differ in size.

Hence, it is generally possible to discern, from the upstream end downstream, a glass sheet loading station, a glass sheet washing station, a station for checking the surface finish of the sheets of glass and the dimensions of the sheets of glass, a station for preparing for the assembly of the two sheets of glass, a station for assembling the sheets of glass, here using the interlayer, and stations for packaging and respectively for removing the assembled glazing.

The station for checking the surface finish of the sheets of glass and the dimensions will advantageously consist of the module 3 with just the fixed chassis described hereinabove, while the preassembly station will consist of the module 3 with the fixed chassis and the moving chassis which we shall now describe, and the assembly station will be identical to the latter module or may form a single station with the preassembly module according to the rate to be achieved on the manufacturing line.

Hence, the holding and positioning module 3 may be designed in a modular form with one, two or three identical modules that may or may not be electronically coupled depending on the length of the substrates. This flexibility makes it possible for example with two modules to preassemble substrates of a length close to that of the first module while at the same time the cycle of moving around the two previous substrates finishes on the second module; this allows the cycle time to be reduced by performing certain tasks in parallel.

For large-dimension glass, the two modules are then coupled synchronously by real-time control loop control.

The module 3 with moving chassis (FIG. 3) therefore comprises the fixed chassis 30 and the moving chassis 40, which are arranged facing one another. The moving chassis in a similar way to the fixed chassis comprises a base 41, a vertical stand 42 inclined by about 6° in a plane parallel to the plane of the stand 32 of the fixed chassis and open at its upper part, two endless belts 43, 44 arranged in a plane parallel to that of the stand 42 and separated from one another by a distance corresponding roughly to the height of a sheet of glass, suction means 45 and 46 associated with the belts, and press rollers 47 for the edge of the sheet of glass, these being placed along the lower part of the stand 42 and able to turn to form a path C2 for progressing the sheet of glass. As we shall explain later on, in this module, the path C1 formed by the rollers 37 is not secured to the fixed chassis 30 as it was in FIG. 2 but is secured to the moving chassis 40. These two paths C1 and C2 are able to be moved along in synchronism relative to the moving chassis by guidance means 48.

The endless belts 43, 44 and the suction means 45, 46 are respectively similar to the belts 33, 34 and to the suction means 35, 36 described above in respect of the fixed chassis 30.

The chassis 40 is able to move translationally in the Z-direction perpendicular to the X-direction in which the sheets of glass are driven by guidance rails 49 in which the stand 42 can slide.

The chassis 30 serves first of all to support a first sheet of glass, such as the sheet 50 routed in from a previous station, to be transferred onto the moving chassis 40 able to be moved and then, in a second stage, another sheet 60 is routed onto the fixed chassis 30 to be brought perfectly to face the first sheet 50 supported by the moving chassis. The issue is thus, with a view to assembling them, one of positioning the two sheets of glass 50 and 60 correctly at the two stop positions facing each other on the paths C1 and C2 and at a chosen separation in the Z-direction.

The stop positions of the sheets of glass 50 and 60 are checked by the driving of the conveyor belts 33, 34, 43 and 44 against which the sheets of glass rest and by the driving of the press rollers 37 and 47. Position sensors are also provided, to provide perfect control and monitoring.

The press rollers 37 and the rollers 47 which respectively constitute two parallel paths C1 and C2 along which the sheets of glass are driven can be moved translationally in a Z-direction perpendicular to the X-direction in which the sheets of glass are driven with a view to not sliding the sheet of glass 50 from one roller path to the other when transferring it onto the moving chassis so as to avoid any knocking of the sheet of glass. Thus, the sheet of glass 50 is received against the fixed chassis 30 and on the path 31 made up of the rollers 37 which at that time corresponds to the reference path for the routing of the glass. The path C1 is then moved in the Z-direction and away from the fixed chassis at the time of the transfer of the sheet of glass 50 from the fixed chassis 30 to the moving chassis 40, transfer occurring by reversing the pressures supplied to the respective box structures of the chassis so that the sheet of glass 50 which was stuck by suction against the belts 33, 34 is unstuck and then becomes stuck against the belts 43, 44 of the moving chassis. The belts 33, 34, 43 and 44 constitute the means for transferring the sheet 50 from the fixed chassis to the moving chassis.

The moving chassis 40 is then moved via the guidance rails 49 as far as the desired position of separation between the sheet of glass 50 and the sheet of glass 60 which will be routed in, the separation corresponding for example to the desired width of the insulating glazing to be manufactured. The sheet of glass 60 is received by the fixed chassis 30 and rests on the path C2 of rollers 47 now corresponding to the reference path for the routing of the glass following the movement of the path C1. The sheet of glass 60 is positioned in the X-direction at the desired point so that it faces the sheet of glass 50. To avoid any drive, a magnetic stud comprising two mutually collaborating elements is associated with the guidance means 48 and, respectively, with the base 41 of the moving chassis so that the movement of the paths C1 and C2 accompanies the movement of the moving chassis.

In a similar way to the module 3 with a fixed chassis described above for, for example, moving around the sheets of glass, the interlayer will be positioned and bonded by moving around the edge faces of the sheets of glass 50 and 60 using another device 1 for collaborating and assisting with moving around that is identical to the one already described and carries the tools 20 and 21 intended to collaborate with the edge faces of the sheets of glass, said tools consisting of systems for delivering the interlayer and coating it with adhesive, in place of the sensors used earlier.

Prior to the fixing of the interlayer, depending on the surface finish established using the sensors and as described above, the device 1 may support tools 20 and 21 of the shaping tool type that allow the edge faces of the glass to be polished at the sites of defects of the burr type when these do not exceed 1 mm in thickness and do not extend over lengths any longer than 50 mm. Advantageously, such shaping tools are also used to machine a rounded portion at the corners of the sheets of glass, this in particular facilitating the subsequent placement of the interlayer.

The interlayer, for example between 0.3 and 0.6 mm thick and delivered with adhesive by a suitable system, is fed in from a reel placed in a magazine which advantageously contains several reels each of which has a different width of interlayer in order readily to adapt to the desired width of insulated glazing (not illustrated).

The collaboration between the delivery and adhesive-coating systems and the sheets of glass occurs in the same way as the way described in the steps illustrated in FIG. 6.

It is absolutely essential that the forces of applying the interlayer be constant regardless of the position and dimension of the sheet of glass so as to ensure that the interlayer is perfectly secured to the edge faces of the sheets of glass. For this reason, according to the invention, on the one hand the tool holder device 1 is a device with control loop control to ensure correct positioning of the tool relative to the glass and, on the other hand, the means for holding and positioning the sheets of glass are also controlled with control loop control to oppose the forces exerted by the movement of the glass as it collaborates with the tool.

Figure 8:
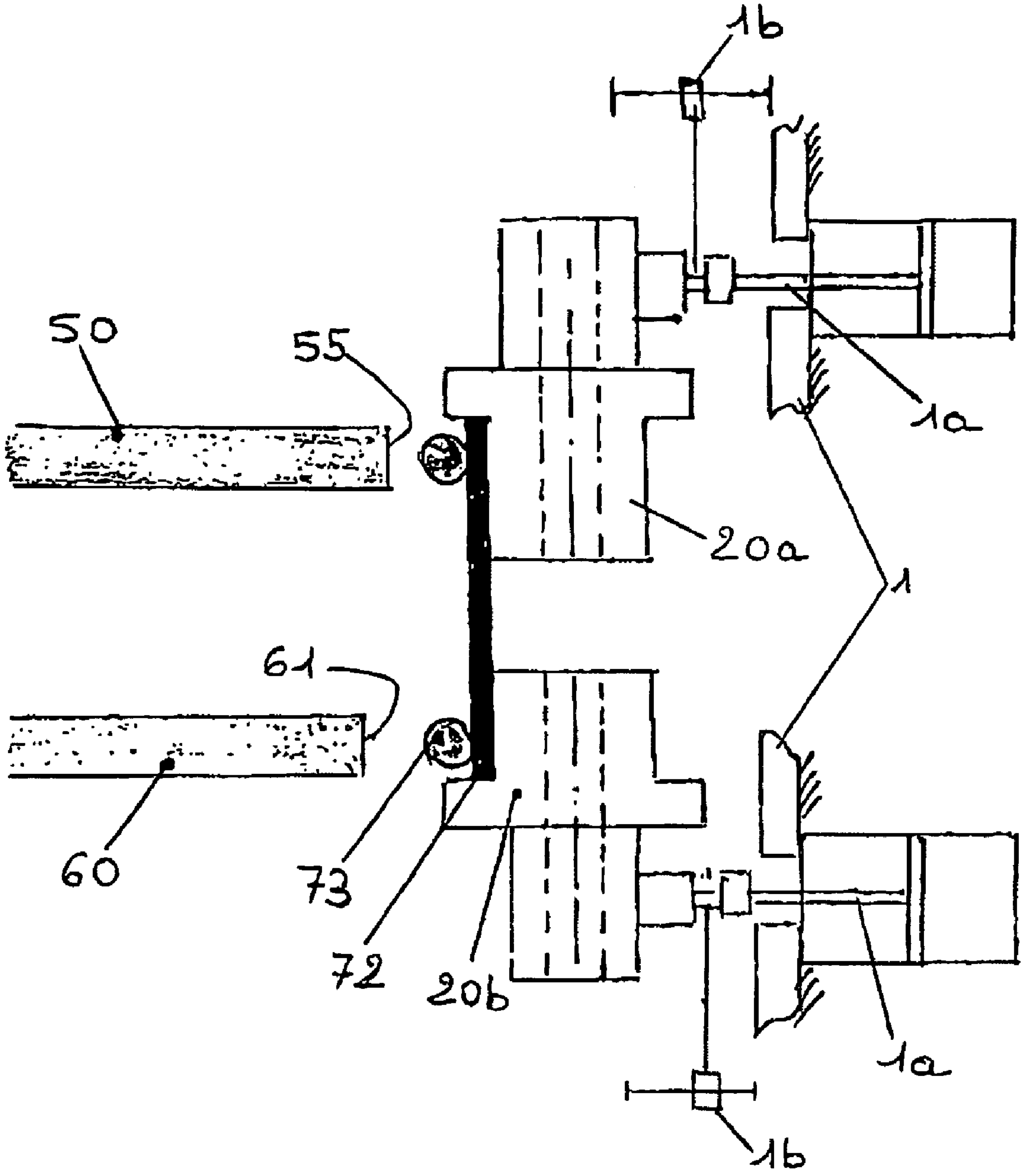
FIG. 8 illustrates an elevation of the device of the invention, bearing a tool for collaborating with the edge faces of two substrates.

For the control loop control of the tool holder device to yield these results, the tool, in this instance a delivery and adhesive-coating system 20 is, advantageously according to the invention, made up of two press rollers 20*a* and 20*b* supporting the interlayer already coated with adhesive and each designed to press against one of the edge faces 55 and 61 of the sheets of glass (FIG. 8). The two rollers have control loop control independent of one another in the direction of the force normal to the edge face of the sheets of glass using means for compensating for the position of the substrates with respect to the tool 1*a* and using position sensors 1*b*. The force exerted by each of the rollers is of the order of 5 to 10 kg. The means compensating for the position of the substrates may, for example, be pneumatic.

The position sensors 1*b* make it possible to check the position of the sheets of glass. Position is adjusted by repositioning the sheet of glass, an operation which is controlled by the control loop control of the means for holding and positioning the sheets of glass and/or by repositioning the tool relative to the edge face or edge faces of the sheets of glass, which is an operation controlled by the control loop control of the tool holder device.

When the operation using the device 1 has been performed on the entirety of the two substrates, the two substrates, for example assembled, are routed to the next station by driving the rollers 37 and 47. The module 3 is then free to receive other sheets of glass. The path C1 has then to be brought back into the continuation of the reference path, a pneumatic ram pushing the magnetic element associated with the guidance means 48 and with the base 41 of the moving chassis.

It must be noted that the translational and rotational movements of all the elements described (tools, belts, routing and drive paths, moving chassis, etc.) are controlled by numerical control means, not illustrated.

Figure 5:
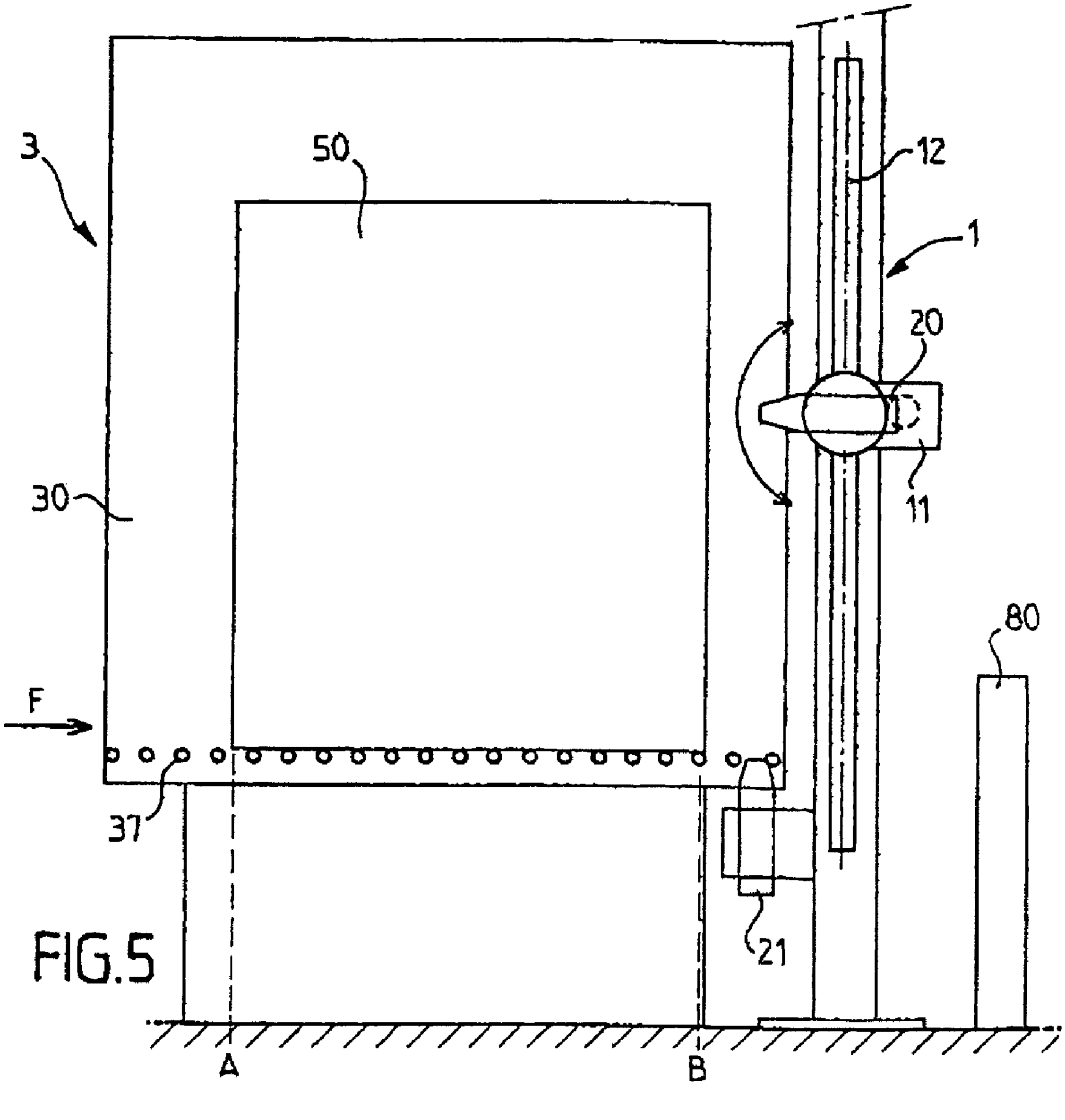
FIG. 5 depicts the device of FIG. 1 with which a module for holding and positioning a glass substrate is associated.

The module 3 associated with a tool holder device 1 cannot be butted up directly against the next station because the device 1 occupies the space separating the module 3 from the next station. In order for small-dimension glass to pass from the module 3 to the next station without the risk of dropping into the intermediate space, a holding system involving suction cups 80, visible schematically in FIG. 5, is provided at the module 3 to take hold of the substrate as the module 3 moves to the next station or the next support element.

Thus, the device 1 of the invention makes it possible to move around the periphery of the glazing optimizing, on the one hand, the time of the operation of collaborating with the glass and, on the other hand, the space occupied by the means in order to achieve this operation. The tool holder device 1 assists the tool with moving around the sheet of glass by rotating the tool so as to position it appropriately facing the sheet of glass and causing the tool to move translationally with respect to the sheet of glass for the operation for which the tool is intended.

Because the device 1 is fixed, it is anticipated, still with a view to optimizing the time of the operation, that a translational movement of the sheet of glass be performed with respect to the tool when the latter is in a fixed position and that a second tool be provided which rests on a fixed support of the beam, in this instance positioned below the horizontal bottom side of a sheet of glass and which is active during this same translational movement of the sheet of glass so that the two tools simultaneously perform their operation on two parallel sides of the sheet, in this instance the horizontal sides of a sheet of glass which are parallel to the routing path.

The translational speed of the sheet of glass from position A to position B and the speed of travel of the tool is dependent on the speed at which the tool is to operate, that is to say on the data acquisition frequency of the sensor for example, on the speed at which the interlayer is delivered to the adhesive-coating system.

An installation may therefore comprise one or more modules 3, these are managed in sequential synchronism so as to provide a step by step stream of substrates without any jerkiness and without creating a buffer region.

In an installation thus comprising at least one tool holder device 1 and at least one module 3, the width of a substrate in the X-direction is of no importance because all that is required, in order to adapt to dimensional increases in the substrate, is for several modules 3 to be butted together.

Finally, such an installation is advantageously compatible with dimensional changes in the height of the substrates because the modules 3 are structures that are open at the top.

The invention claimed is:

1. A tool holder device for supporting at least one tool configured to collaborate with an edge of at least one substrate, the device comprising:

a first tool configured to move translationally and rotationally;

a second tool arranged fixedly and configured to operate while the at least one substrate is moving translationally;

a rotary support configured to receive the first tool, and to move translationally along a vertical beam and rotationally relative to the at least one substrate;

the vertical beam provided with the rotary support and with a linear guidance element extending at least partially over a height of the vertical beam, the linear guidance element being configured to prevent the rotary support from rotating when the rotary support is moved translationally, wherein the at least one substrate is moved translationally relative to the first tool supported by the rotary support, as the first tool is operating in a predetermined position, collaboration between the first tool and the at least one substrate occurs with or without contact relative to an edge face of the at least one substrate, and the first tool is configured to apply and bond an interlayer to all or part of a periphery and to the edge faces of at least two substrates facing each other, and the second tool is configured to measure, machine, shape, or surface treat the at least one substrate, the first tool being different from the second tool.

2. The device as claimed in claim 1, wherein the rotational support is controlled via a control loop to ensure precise positioning of the first tool relative to the at least one substrate.

3. The device as claimed in claim 2, further comprising:

means for compensating for a position of the at least one substrate; and at least one position sensor, wherein the means for compensating and the at least one position sensor are associated with the first tool.

4. The device as claimed in claim 3, wherein the means for compensating for the position of a substrate and a position sensor are associated with each of the press rollers respectively.

5. The device as claimed in claim 2, wherein the rotational and translational movements of the first tool and the control loop control of the rotational support are controlled by a numerical control.

6. The device as claimed in claim 1, wherein the first tool comprises at least two press rollers each configured to press against one of the edge faces of the two substrates, the two process rollers being control-loop controlled independently.

7. The device as claimed in claim 1, wherein the first tool is fixed to the rotary support.

8. The device as claimed in claim 1, wherein the vertical beam is provided with a fixed support, the fixed support being configured to hold the second tool.

9. An installation comprising:

a tool holder device as claimed in claim 1, and at least one module for progressing, holding, and positioning the at least one substrate in X, Y, Z directions of space facing the tool holder device.

10. The installation as claimed in claim 9, wherein the at least one module for progressing, holding, and positioning comprises a fixed chassis that comprises a substantially vertical stand, means for holding and positioning a substrate against the stand in the X and Y directions, and means for holding and positioning the substrate in the Z-direction.

11. The installation as claimed in claim 10, wherein the means for holding and positioning the substrate against the stand in the X and Y directions and the means for holding and positioning the substrate in the Z-direction is controlled through a control loop.

12. The installation as claimed in claim 10, wherein the means for holding and positioning the substrate against the stand in the X and Y directions and the means for holding and positioning the substrate in the Z-direction substrate comprise conveyor belts and suction means for holding the substrate tightly against the conveyor belts.

13. The installation as claimed in claim 12, further comprising an additional high-performance suction device to generate a tangential holding force holding the substrate at the end of the at least one module.

14. The installation as claimed in claim 9, wherein the at least one module for progressing, holding, and positioning comprises a fixed chassis and a moving chassis, the fixed chassis and the moving chassis collaborating with one another to each support at least one substrate, the substrates being placed facing each other and positioned relative to one another with a given separation.

15. The installation as claimed in claim 14, wherein the fixed chassis and the moving chassis are open in their upper part so as to support substrates of any dimensions.

16. The installation as claimed in claim 14, wherein the moving chassis comprises means for positioning, in the Z-direction, the substrate resting on the moving chassis so as to obtain a desired separation between the two substrates.

17. The installation as claimed in claim 14, wherein the moving chassis comprises means for holding and positioning, in the X-direction, the two substrates resting on the fixed and moving chassis, the means for holding and positioning configured to be moved in the Z-direction independently of the moving chassis.

18. The installation as claimed in claim 9, wherein the at least one module comprises means for transferring a substrate supported by a fixed chassis to a moving chassis.

19. The installation as claimed in claim 9, wherein a holding system using suction cups is provided, associated with the at least one module, to route, from the at least one module to an adjacent support element, a substrate which, in the X-direction, has a dimension substantially equivalent to or smaller than a space separating the module from the support element adjacent to the at least one module.

20. The installation as claimed in claim 9, further comprising plural modules for progressing, holding, and positioning substrates, which may or may not be electronically coupled depending on lengths of the substrates.

21. The installation as claimed in claim 9, wherein the at least one module for progressing, holding, and positioning constitutes a module for preassembling or assembling an insulating glazing comprising at least two glass substrates and an interlayer secured to all or part of a periphery of the at least two glass substrates.

* * * * *